US010317065B2

(12) United States Patent
Holmes et al.

(10) Patent No.: US 10,317,065 B2
(45) Date of Patent: Jun. 11, 2019

(54) LED LIGHTING SYSTEM WITH FORCED AIR COOLING

(71) Applicant: SPORTSBEAMS LIGHTING, INC., Round Rock, TX (US)

(72) Inventors: Fred H. Holmes, Cleveland, OK (US); Kevin C. Baxter, Glendale, CA (US)

(73) Assignee: Sportsbeams Lighting, Inc., Plano, TX (US)

( * ) Notice: Subject to any disclaimer, the term of this patent is extended or adjusted under 35 U.S.C. 154(b) by 0 days.

(21) Appl. No.: 15/135,864

(22) Filed: Apr. 22, 2016

(65) Prior Publication Data

US 2016/0238227 A1 Aug. 18, 2016

Related U.S. Application Data

(63) Continuation of application No. 14/698,781, filed on Apr. 28, 2015, now Pat. No. 9,341,362.

(Continued)

(51) Int. Cl.
*F21V 29/58* (2015.01)
*F21V 5/04* (2006.01)

(Continued)

(52) U.S. Cl.
CPC .............. *F21V 29/59* (2015.01); *F21V 5/045* (2013.01); *F21V 29/51* (2015.01); *F21V 29/56* (2015.01);

(Continued)

(58) Field of Classification Search
CPC ...... F21V 29/02; F21V 29/006; F21V 29/004; F21V 29/30; F21V 29/40; F21V 29/56;

(Continued)

(56) References Cited

U.S. PATENT DOCUMENTS 5,036,248 A 7/1991 McEwan et al.
6,241,366 B1 6/2001 Roman et al.

(Continued)

FOREIGN PATENT DOCUMENTS

CN 101142435 A 3/2008
CN 102606945 B 7/2012

(Continued)

OTHER PUBLICATIONS

Search Report dated Jul. 20, 2018, Issued by State Intellectual Property Office of Peoples Republic of China for CN Application No. 201580035226.8.

*Primary Examiner* — Robert J May
(74) *Attorney, Agent, or Firm* — Scott R. Zingerman

(57) ABSTRACT

An outdoor area LED lighting system including: a housing containing a large array of LEDs mounted to an aluminum direct thermal path printed circuit board and a single lens. The large array of LEDs are capable of producing light rays directed through the single lens to produce a beam of light to illuminate the outdoor area. The single lens is preferably a Fresnel lens. The housing is preferably capable of being sealed in a weather-tight manner. A second housing may at least partially surround the first housing such that at least one air passage is provided between the first housing and the second housing. A heat sink including a heat block in thermal communication with a plurality of heat tubes and fin assemblies may be in partial thermal contact with the LED module and in fluid communication with the at least one air passage. At least one fan may be provided in or in fluid communication with said at least one air passage to cool the heat sink. A digital interface may connect the LED module to a host computer to monitor and track information and trending for statistical process control.

18 Claims, 14 Drawing Sheets

Related U.S. Application Data

(60) Provisional application No. 61/985,345, filed on Apr. 28, 2014.

(51) Int. Cl.

| | |
|---|---|
| ***F21V 31/00*** | (2006.01) |
| ***F21V 29/56*** | (2015.01) |
| ***F21V 29/71*** | (2015.01) |
| ***F21V 29/51*** | (2015.01) |
| ***F21V 29/83*** | (2015.01) |
| *F21V 7/22* | (2018.01) |
| *F21W 131/105* | (2006.01) |
| *F21V 23/04* | (2006.01) |
| *F21V 29/67* | (2015.01) |
| *F21Y 101/00* | (2016.01) |
| *F21Y 115/10* | (2016.01) |

(52) U.S. Cl.

CPC ............ *F21V 29/717* (2015.01); *F21V 29/83* (2015.01); *F21V 31/00* (2013.01); *F21V 7/22* (2013.01); *F21V 23/045* (2013.01); *F21V 29/673* (2015.01); *F21W 2131/105* (2013.01); *F21Y 2101/00* (2013.01); *F21Y 2115/10* (2016.08)

(58) Field of Classification Search

CPC ........ F21V 11/183; F21V 11/18; F21V 5/045; F21Y 2101/006

See application file for complete search history.

(56) References Cited

U.S. PATENT DOCUMENTS

| | | | | |
|---|---|---|---|---|
| 6,796,690 | B2 | 9/2004 | Bohlander | |
| 7,244,048 | B2 | 7/2007 | Poggi | |
| 7,600,892 | B2 | 10/2009 | Belliveau et al. | |
| 7,629,570 | B2 | 12/2009 | Mondloch et al. | |
| 8,662,702 | B2 | 3/2014 | Datz et al. | |
| 8,702,255 | B2 | 4/2014 | Baxter et al. | |
| 8,888,319 | B2 | 11/2014 | Lee et al. | |
| 2003/0179584 | A1 * | 9/2003 | Pond ........................ | B60Q 1/32 362/487 |
| 2005/0111234 | A1 | 5/2005 | Martin et al. | |
| 2006/0083017 | A1 | 4/2006 | Wang et al. | |
| 2007/0139921 | A1 | 6/2007 | Wu | |
| 2008/0212333 | A1 * | 9/2008 | Chen ....................... | F21V 29/02 362/373 |
| 2009/0237937 | A1 | 9/2009 | Liu | |
| 2010/0242519 | A1 | 9/2010 | Breidenassel et al. | |
| 2011/0013401 | A1 | 1/2011 | Gordin et al. | |
| 2011/0043120 | A1 | 2/2011 | Panagotacos et al. | |
| 2012/0092870 | A1 | 4/2012 | Tralli et al. | |
| 2013/0223064 | A1 | 8/2013 | Lee et al. | |
| 2014/0022780 | A1 | 1/2014 | Roberge et al. | |
| 2014/0043810 | A1 | 2/2014 | Jo et al. | |
| 2014/0119019 | A1 | 5/2014 | Hsu | |

FOREIGN PATENT DOCUMENTS

| | | | |
|---|---|---|---|
| CN | 103492787 | A | 1/2014 |
| JP | 2011090854 | A | 5/2011 |
| TW | 200535372 | A | 11/2005 |
| TW | M448605 | U | 3/2013 |
| WO | 2010058326 | | 5/2010 |
| WO | 2012099391 | A2 | 7/2012 |
| WO | 102606945 | B | 11/2013 |
| WO | 2014021087 | A1 | 2/2014 |

* cited by examiner

LED LIGHTING SYSTEM WITH FORCED AIR COOLING

CROSS REFERENCE TO RELATED APPLICATION

This application claims the benefit of U.S. Provisional Application No. 61/985,345 filed Apr. 28, 2014, and is a continuation of co-pending U.S. application Ser. No. 14/698,781 filed on Apr. 28, 2015, herein incorporated by reference in its entirety for all purposes.

FIELD OF THE INVENTION

The present invention relates to LED based light fixtures. More particularly, but not by way of limitation, the present invention relates to a venue lighting system for arenas and stadiums employing light emitting diodes.

BACKGROUND OF THE INVENTION

The demands of venue lighting are unique. For example, NFL stadiums generally light the field with a minimum of 250 foot candles at any point on the playing surface. To achieve this level of illumination with metal halide lamps requires roughly one megawatt of electrical power for the field alone. While metal halide lamps are presently the standard, they are not without drawbacks.

One concern with metal halide (also known as high intensity discharge, or HID) lamps is bulb life. While lower wattage bulbs may exhibit as high as 20,000 hour bulb life, higher power bulbs, such as the 1,500 watt bulbs commonly found in stadium fixtures, typically have bulb life expectancy in 3,000 hour range. A number of other concerns are related to bulb life, such as: envelope failure (bulb explosion) occasionally occurs towards the end of life or during bulb changes; lumen maintenance (brightness fall-off); cycling where the bulb turns off and on, seemingly at will; etc. While envelope failure is not common, it is of major concern since the envelope is made of glass and fixtures must enclose the bulb in such a way that flying glass cannot escape. Regardless, bulb failures in a fixture mounted on a tower high above a stadium are expensive and unwanted. To avoid catastrophic failures, many metal halide bulb manufacturers recommend group re-lamping at the end of the stated life, rather than spot changing individual bulbs.

Another concern is start-up and hot restrike. In a conventional probe-type metal halide bulb, ignition of a cold bulb involves igniting a small starter arc which brings the gasses in the bulb up to pressure and heats the gasses so that they are more easily ionized to start the main arc. This process typically take five to seven minutes, during this time the bulb produces significantly less light and the color temperature fluctuates significantly. Newer pulse start bulbs eliminate the probe and warm up times are reduced, but warm up can still take on the order of two to four minutes. While 1,500 watt pulse start bulbs and ballasts are available, they have not been widely accepted for field lighting, generally speaking, pulse start technology has found favor in lower wattages.

Hot restrike is of greater concern than initial start-up. Probe-type bulbs in the wattage range used for field lighting will not restart when the gasses in the bulb are hot. The hot restrike process can take up to 20 minutes. This problem was brought to the world's attention during the Superbowl in February 2013 when a momentary loss of power resulted in a 45 minute blackout during the game. Pulse start bulbs similarly reduce hot restrike times but the time delay required to reignite a bulb are still measured in minutes. Instant restrike ballasts are available for pulse start bulbs, but voltages on the order of 30,000 to 40,000 volts are required to restrike a hot 1,500 watt bulb. These voltages limit the distance between the bulb and the ballast and require special wiring with very high dielectric strength insulation to avoid arcing outside the bulb during a hot restrike.

Another concern in using metal halide bulbs is video production. Obviously video production of sporting events is a concern at the professional and college level, but video streaming has brought these concerns to even the high school level. While the broad spectrum nature of metal halide bulbs is generally good for video production, the light is not optimum for televising sports. For example, all metal halide bulbs are driven with alternating current. This means the arc reverses at twice the operating frequency. In the United States, a metal halide bulb, with a magnetic ballast, will flicker at 120 Hertz. If high frame rates are employed for slow motion, this flicker will be obvious in the final video. While high frequency electronic ballasts reduce the effect, it still exists.

Another issue for video production is the color rendering index ("CRI") of the light. A simplistic definition of CRI is the percentage deviation between a light source and sunlight, but the effect is the ability of the light source to render colors. Skin tones are especially problematic for low CRI light sources. The metal halide bulbs used in sports complex lighting typically have a CRI of about 65. While the light produced by such bulbs usually appears very white, the light typically has a surplus of energy in the 500 nm range of the spectrum, or a green spike. A green spike, coupled with green light bounce off the field, is typically handled by "white balancing" the cameras, but is still less than ideal for professional video production.

Yet another concern with metal halide bulbs is the production of ultraviolet light (UV). These bulbs produce significant amounts of short wave UV which can be dangerous to humans. Most bulbs include a borosilicate or fused silicate outer envelope which will absorb the vast majority of the short wave UV light. If the outer envelope is broken, most metal halide bulbs will continue to function but will emit dangerous amounts of UV light. So called "flash burns" or sunburn of the eye is a real danger to people in proximity to such bulbs. Even with the outer envelope in place such bulbs emit enough UV light to be damaging to plastics and can cause some finishes to fade over time.

Finally, there are environmental concerns with the disposal of such bulbs, in particular due to the use of mercury. While manufacturers have found ways to reduce the amount of mercury used in metal halide bulbs, some mercury is required to produce white light. Since the bulb envelope is glass, breakage after disposal is likely and thus the release of mercury is likely.

Light emitting diodes (LEDs) offer improvements over metal halide bulbs in all of these areas. However, light emitting diodes are not without their own challenges. Perhaps the biggest challenge to producing an LED luminaire for venue lighting is thermal management. A metal halide bulb radiates close to 85% of the input power as visible light, ultraviolet light and infrared energy, leaving 15% of the power which must be dissipated into the environment through conduction. In contrast, an LED radiates virtually no ultraviolet light and virtually no infrared energy, thus at least 55% of the input power must be dealt with through conduction. This is particularly problematic with large arrays of lights where hot air from lower fixtures in the array effectively raises the ambient temperature around higher fixtures.

LEDs are finding their way into indoor venue lighting. Such lights offer the advantage of instant on, whether hot or cold, and are even full range dimmable, unlike their metal halide counterparts. Indoor fixtures, of course, do not have to accommodate a wide range of ambient temperatures. Indoor venues can easily employ larger numbers of lower power fixtures, which can be located directly above the playing surface. Further, indoor fixtures do not have to compete with daytime light levels.

Some attempts have been made at lighting outdoor venues with LED fixtures. To date, such fixtures have been very large compared to metal halide fixtures or produce far less light for a comparable form factor. This would be particularly problematic in retrofitting towers in existing venues which have metal halide fixtures. Regardless, in both indoor and outdoor attempts, these fixtures have employed one lens for each LED or module, all employ multiple lenses. All of these lights will exhibit an inverse square fall off the light when the light strikes the playing surface at an angle and not straight-on. Typically these lenses have a relatively short focal length making it difficult to manufacture a fixture with consistent focus from LED-to-LED. The result is a bright hot-spot in the middle of the beam. Thus, to achieve very even lighting of the field is very difficult, at best.

Finally, neither metal halide lamps nor existing LED fixtures are particularly dark sky friendly. A movement has been afoot for several years to reduce unwanted light spillage into the night sky, or “light pollution.” Many outdoor metal halide fixtures include an “eyebrow” or visor to reduce the amount of upward spillage. This is only marginally effective. Metal halide bulbs emit light spherically. Only a small portion of the produced light is emitted toward the field. Fixtures typically use an aluminum reflector to capture some of the light headed rearward and reflect and focus it toward the field. A little more than one-third of the light produced by the bulb actually makes it to the intended target. Even with the visor, a significant portion finds its way skyward.

Individual LEDs are typically packaged to emit nearly all of the produced light in a forward direction. The types of LEDs currently employed in venue lighting typically emit light in a 120 degree beam. Most known fixtures use multiple small molded lenses, often called TIR lenses, to capture virtually all of this light and focus it into a narrower beam. Unfortunately, these fixtures also then employ a second clear lens to protect the LEDs and molded lenses from the elements. Some of the light striking this lens is reflected rearward into the fixture and later reflected back out of the fixture in random directions, including skyward.

Many outdoor architectural light fixtures, as well as other large outdoor area lighting fixtures, suffer from these same problems. In particular, inverse square fall off and dark sky issues are problematic in metal halide fixtures used to wash building walls, in fixtures used for airport tarmac lighting, etc.

Thus there is a need for a high power stadium outdoor light fixture which will minimize lamp replacements, is not constrained by a restrike interval, provide video friendly light, minimizes emissions outside the visible light range, provides effective thermal management, will not fail explosively, and minimizes skyward light emissions.

SUMMARY OF THE INVENTION

The present invention provides an LED based light fixture for venue lighting which overcomes the problems discussed above.

In one preferred embodiment an LED fixture is provided which includes a weather-tight housing, a high power LED array housed within the housing, a Fresnel lens covering the forward end of the housing, and a heat sink in thermal communication with the array for dissipating the heat produced by the module into the environment.

In another preferred embodiment, the inventive LED fixture further includes a fan for moving air over the heat sink to increase the rate at which heat is dissipated from the heat sink. Optionally, duct work may be used to discharge the heated air outside an enclosed venue during warm weather or duct the air to field level or to spectators during cold weather.

In a particular preferred embodiment, the LED fixture includes a two-part structure. One part of the two part structure includes the weather-tight housing enclosing the LED array, Fresnel lens and in some embodiments the heat sink. The second part of the two-part housing is not weather-tight and generally includes the power dissipating portion of the heat sink, the fan for moving air and air passages formed between the housings to allow the air to dissipate heat from the heat sink.

Another preferred embodiment includes an outdoor area LED lighting system including: a housing containing a large array of LEDs mounted to an aluminum direct thermal path printed circuit board and a single lens. The large array of LEDs are capable of producing light rays directed through the single lens to produce a beam of light to illuminate the outdoor area. The single lens is preferably a Fresnel lens. The housing is preferably capable of being sealed in a weather-tight manner. A second housing may at least partially surround the first housing such that at least one air passage is provided between the first housing and the second housing. A heat sink including a heat block in thermal communication with a plurality of heat tubes and fin assemblies may be in partial thermal contact with the LED module and in fluid communication with the at least one air passage. At least one fan may be provided in or in fluid communication with said at least one air passage to cool the heat sink.

In yet another preferred embodiment the heat sink is liquid cooled and the liquid is pumped to a location remote from the fixture for dissipating the heat into the environment. As used herein, unless otherwise stated, the term liquid and liquid cooled shall include any liquid known for cooling and heat transfer, including without limitation, water, antifreeze, a mixture, or other suitable liquids.

In still another preferred embodiment the LED array accommodates an input power of at least 1,000 watts and the LEDs are mounted on an aluminum substrate circuit board.

In still another preferred embodiment the inventive LED fixture provides an asymmetric array of LEDs and projects the light from the array through a single lens thus producing a beam of light having a predetermined gradient of light across the beam. The light is thus shaped to overcome the inverse square fall off of light associated with the light striking its target at an angle.

Further objects, features, and advantages of the present invention will be apparent to those killed in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
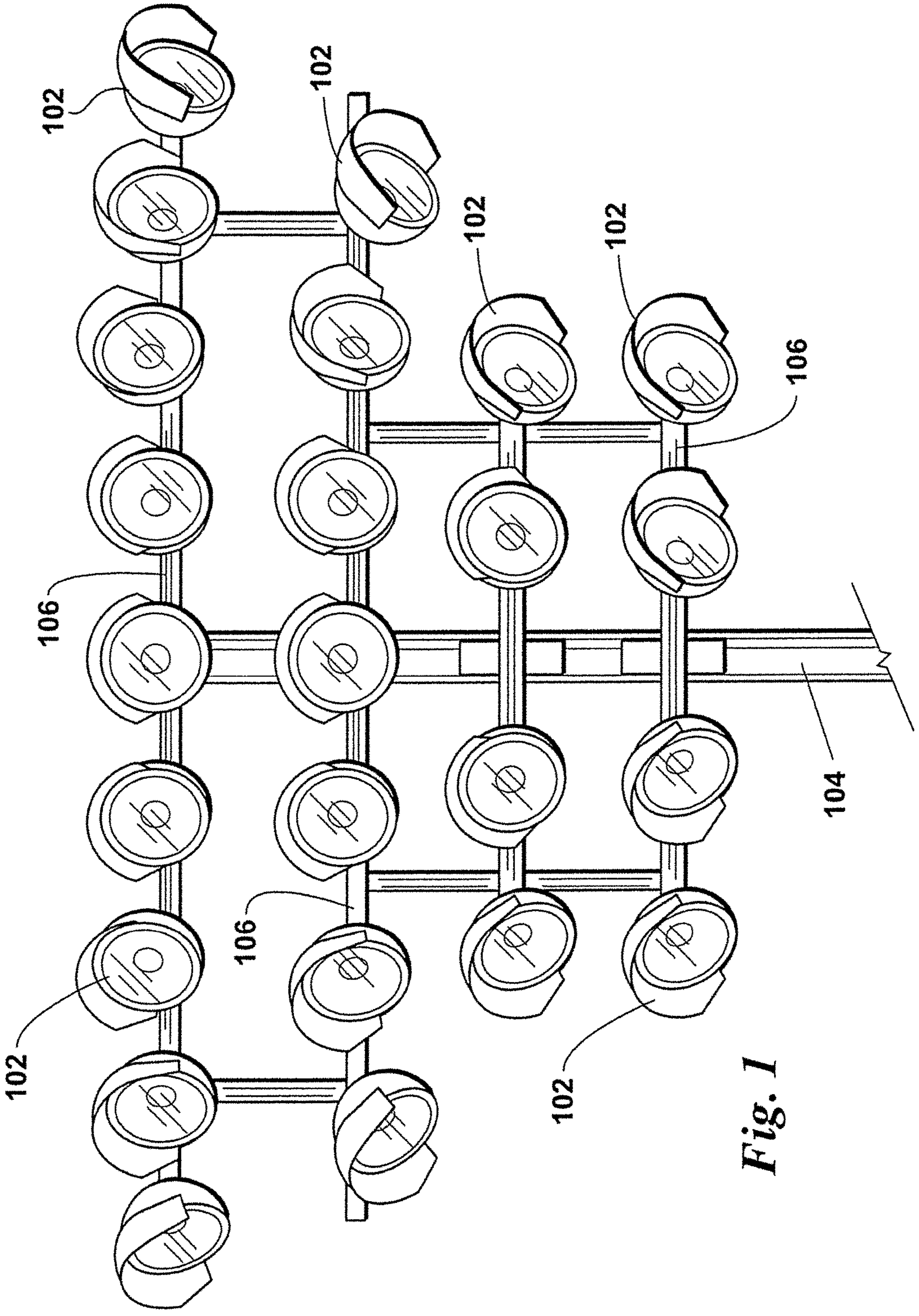
FIG. 1 depicts a preferred embodiment of the inventive LED fixture for venue lighting in its general environment.

Referring now to the drawings, wherein like reference numerals indicate the same parts throughout the several views, one preferred embodiment of a light emitting diode based venue light 102 is shown in its general environment in FIG. 1. As is well known in the art, to light a playing field requires a number of fixtures 102 (24 shown) usually mounted on a tower, pole 104, or stand. The precise number of lights depends on desired light levels, driven mainly by the level of play. By way of example, 25 foot candles of light delivered to the field may be acceptable for outdoor sports at the municipal or high school level, 150 foot candles is generally acceptable for nationally broadcast college games, and 250 foot candles for professional football stadiums. While the safety of the players and spectators is a consideration, the needs of television broadcasters are a major consideration in determining lighting levels at college and professional venues. Typically fixtures 102 are mounted to pole 104 by way of cross arms 106, or perhaps one or more trusses. In some cases, catwalks may be located proximate each cross arm 106 to facilitate aiming and maintenance of fixtures 102.

Figure 2:
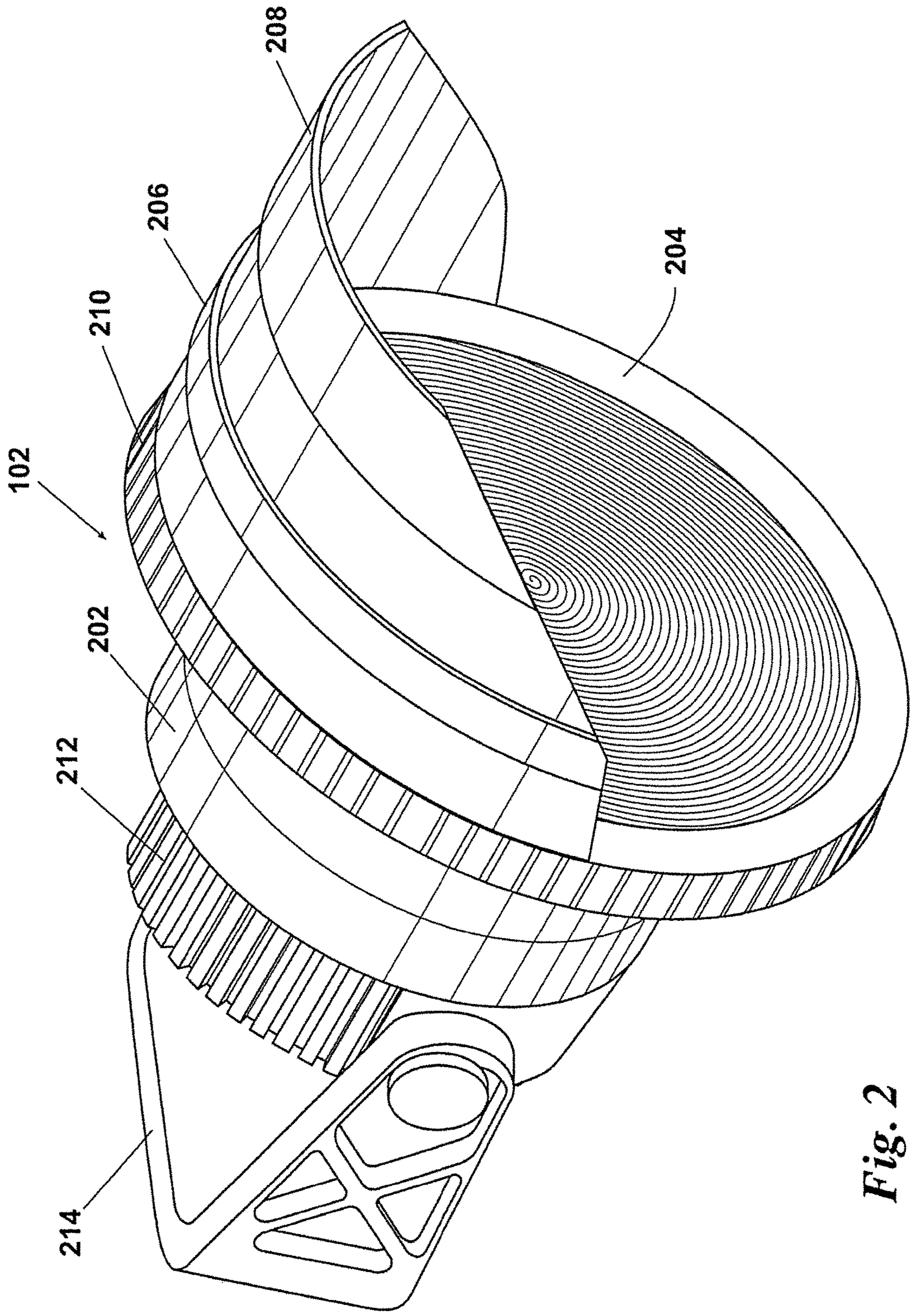
FIG. 2 provides a perspective view of the inventive luminaire for use in outdoor venue lighting.

For purposes of the present invention, the terms "fixture," "luminaire," and "head" are used interchangeably to refer to a single lighting instrument, such as fixture 102. Turning to FIG. 2, in one preferred embodiment fixture 102 comprises: a housing 202; a lens 204 at a forward end of housing 202, wherein lens 204 is preferably a plastic Fresnel lens attached to housing 202 in a weather-tight manner; a forward bezel 206 for receiving lens 204 and visor 208; ring 210 which allows entry of cooling air; aft (or second) cover assembly 212; and yoke 214 pivotally attached to aft (or second) housing 212.

Figure 3:
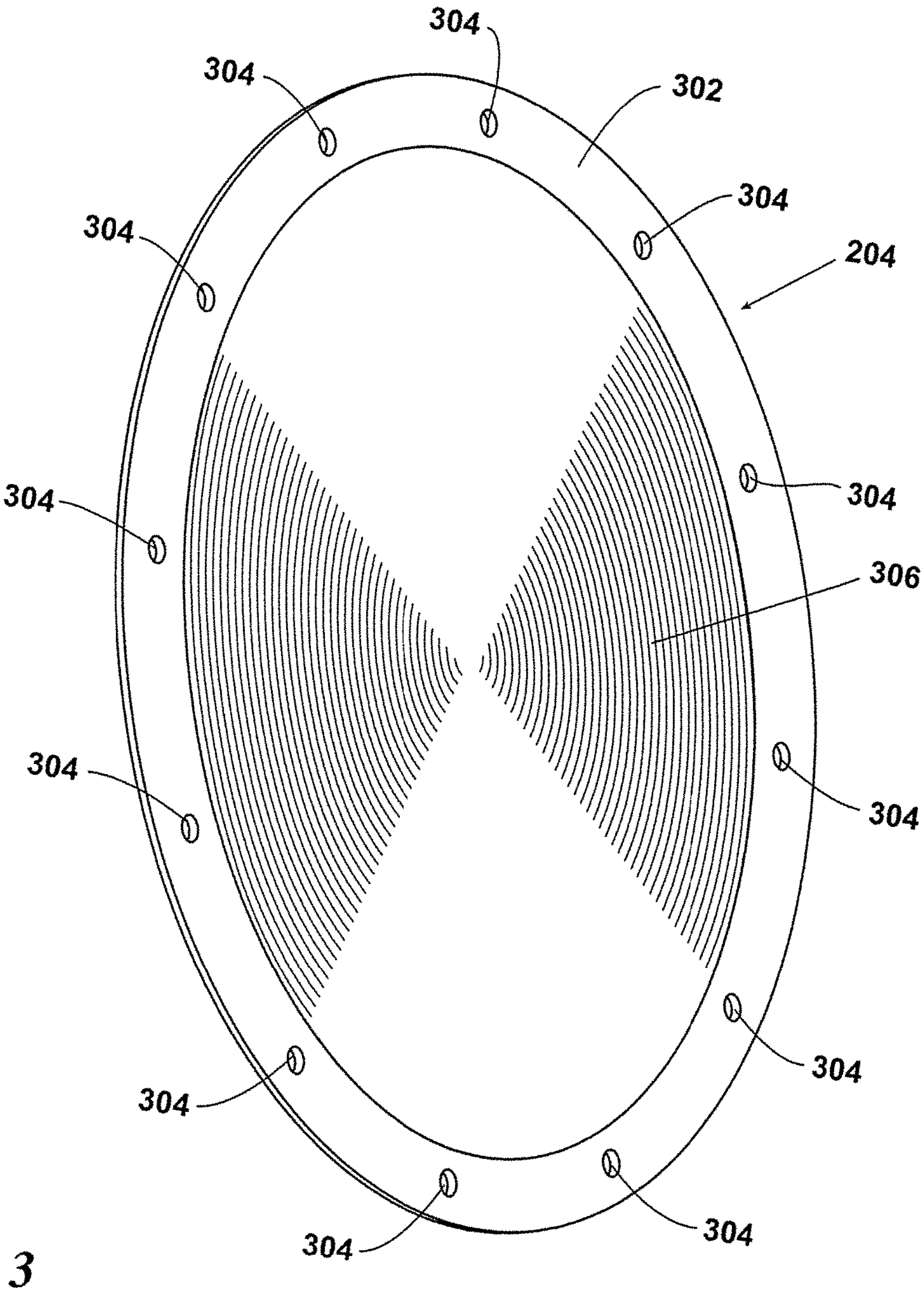
FIG. 3 provides a perspective view of a plastic Fresnel lens as used in the luminaire of FIG. 2.

With reference to FIG. 3, preferably lens 204 is a Fresnel lens, preferably formed of a transparent plastic, such as acrylic or polycarbonate. In one preferred embodiment lens 204 includes a flange 302 including a plurality of holes 304 (12 shown) for securing to the housing with screws and a refractive area 306.

Figure 4:
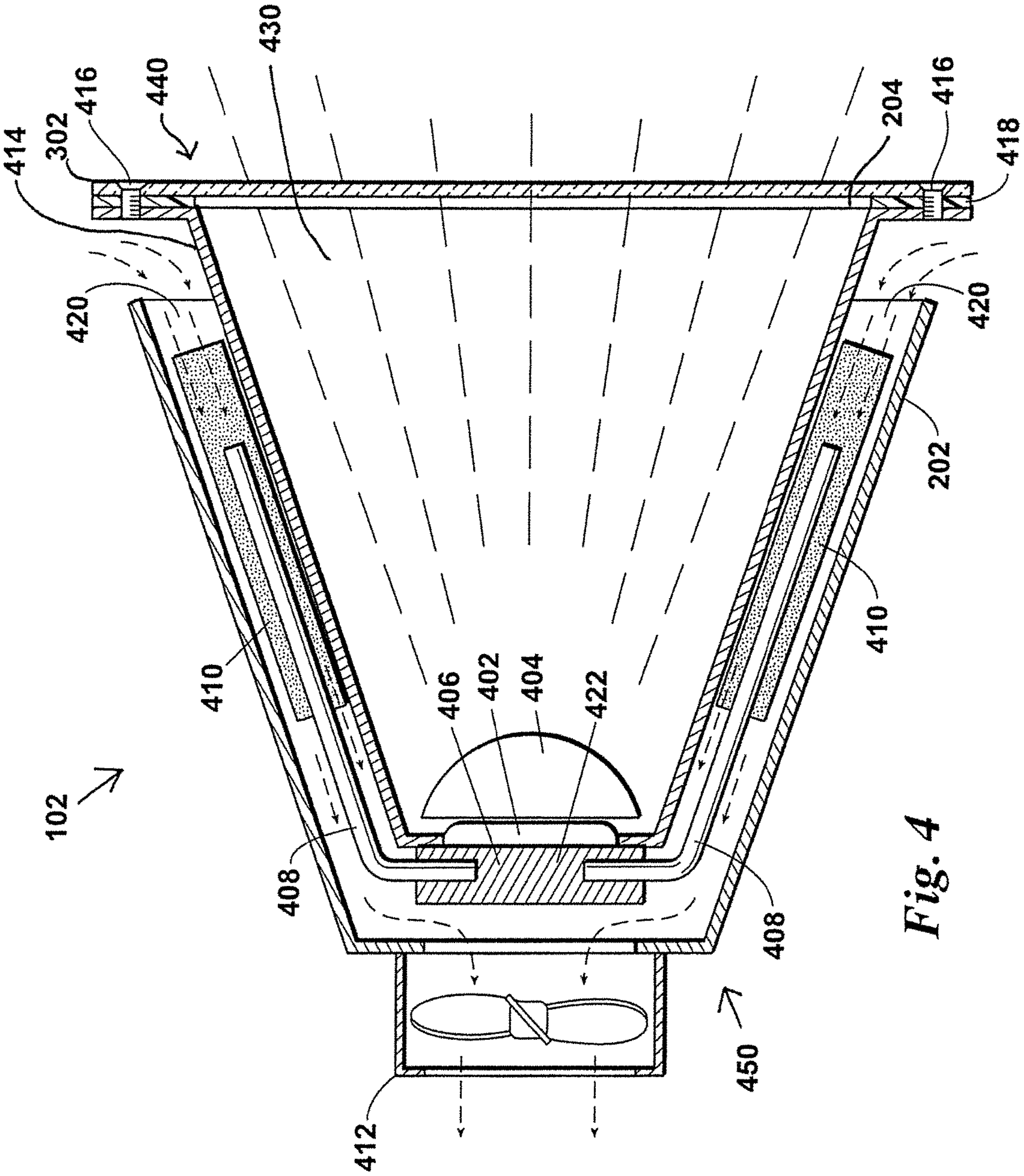
FIG. 4 provides a cutaway side view of the luminaire of FIG. 2 showing interior features of the fixture.
Figure 5:
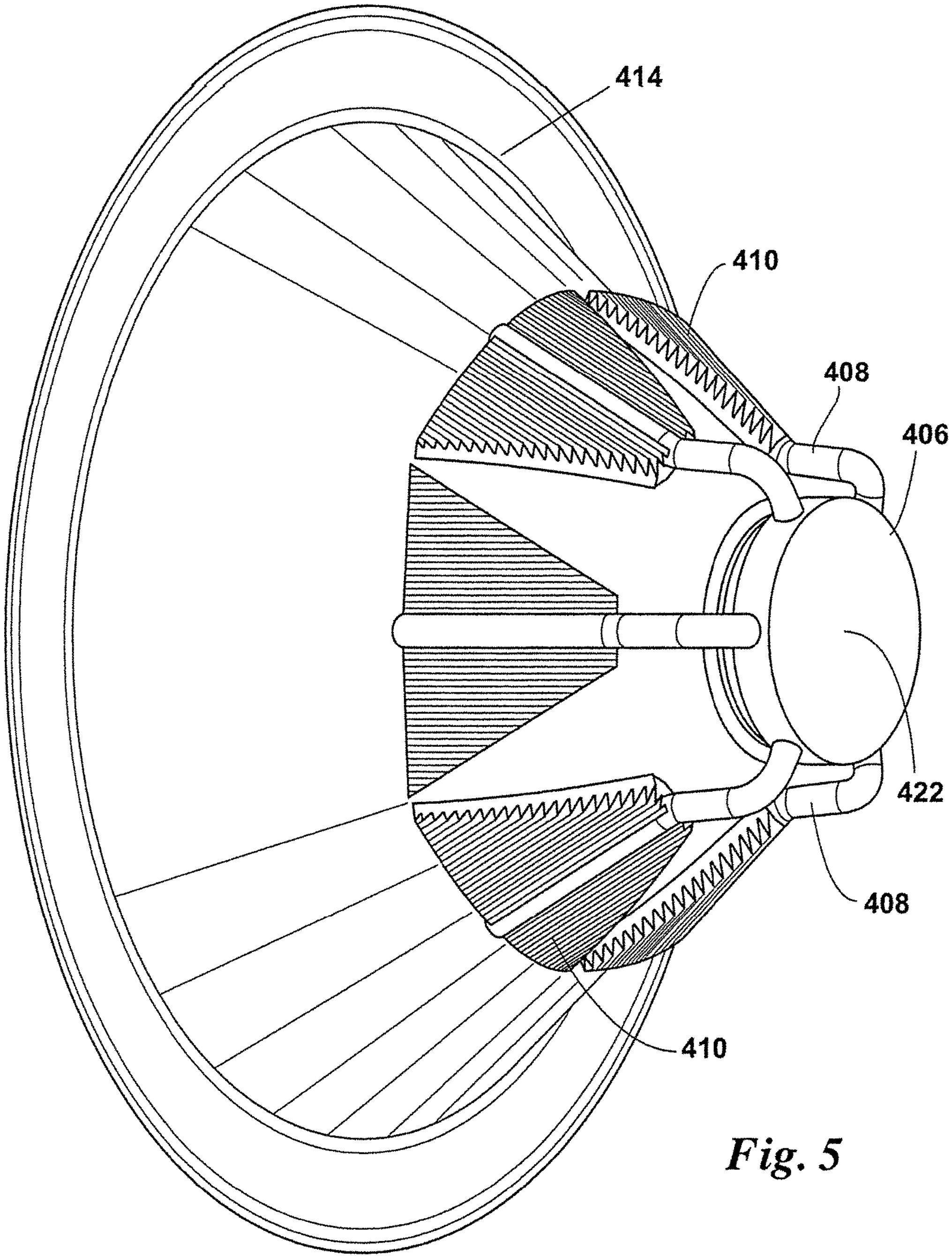
FIG. 5 provides a rear view of the reflector and heat sink housed inside the fixture of FIG. 2

Turning next to FIGS. 4 and 5, wherein the interior details of luminaire 102 are shown, luminaire 102 further comprises a first housing 440 which may be a reflector 414 received inside of second housing 202 to create airway 420. Reflector 414 has a forward opening over which lens 204 is mounted using screws 416. A ring-like gasket 418 is received between lens 204 and reflector 414 to protect the interior of fixture 102 from inclement weather in a weather-tight manner. As used herein, the term weather-tight or weather-tight manner does not, necessarily, require an air-tight submersible seal but instead capable of sealing against rain, blown dust and debris and the like. Towards the back end of reflector 414 light emitting diode module 402 is mounted to heat sink 406 such that light emitted from module 402 is directed towards lens 204. In one preferred embodiment, LED 402 is a chip-on-board, or COB, type module. One such module is a VERO 29 LED module manufactured by Bridgelux, Inc. of Livermore, Calif. Such modules are well known in the art. COB modules typically emit light over about a 120 degree beam. To maximize the light harnessed from LED module 402, condensing lens 404 may be used to collect and direct the light towards Fresnel lens 204.

Heat sink 406 includes heat block 422 which provides a mounting surface for module 402 and receives a plurality of heat tubes 408. Heat tubes 408 conduct heat produced by module 402 to fin assemblies 410 which are located in airway 420 distributed about the periphery of reflector 414. It is a feature of the fixture 102 of the present disclosure to include a two-part housing. The first part housing 440 of the two-part housing includes LED module 402, lens 404, reflector 414 (which may form a segment of first part housing 440), and Fresnel lens 204 all sealed by gasket 418 compressed by screws 416. In certain embodiments, the heat block 406 may be at least partially within first part housing 440. It shall be understood by one skilled in the art that first part housing 440 may be sealed in a variety of suitable ways, including adhesive, mating threads between reflector 414 and flange 302 (or Fresnel lens 204), interlocking tabs, rivets, or the like. A second part housing 450 includes outer housing 202, typically heat block 406, heat tubes 408, fin assemblies 410 and fan assembly 412. An airway or air passage 420 is formed between first part housing 440 and second part housing 450. Fan 412 draws air into airways 420, through fin assemblies 410, and discharges the heated air out the back of fixture 420, thus providing cooling of fixture 102.

Figure 4A:
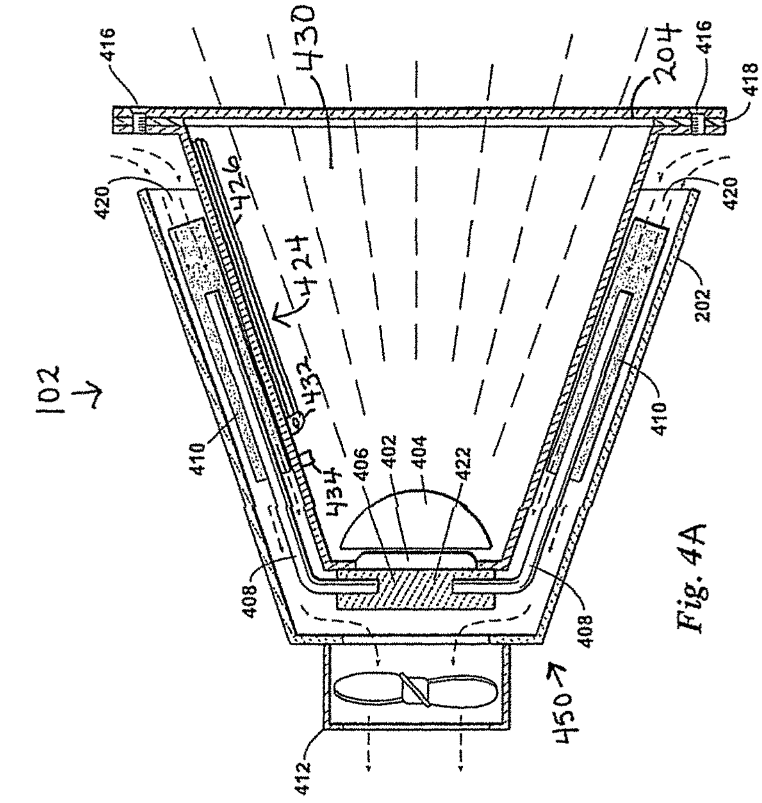
FIG. 4A is the cutaway side view of FIG. 4 further depicting an alternate embodiment shutter shown in a retracted or open position.
Figure 4B:
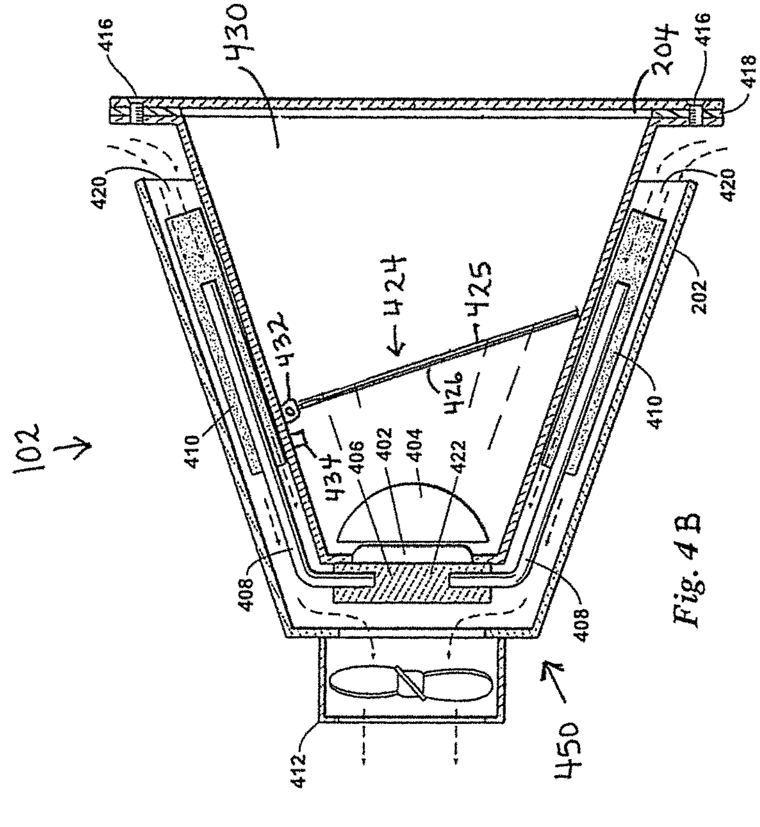
FIG. 4B is the cutaway side view of FIG. 4 depicting the alternate embodiment shutter shown in an extended or closed position.

The geometry of first part housing 440 and second part housing 450 may be varied as desired or required for design and/or application purposes. For example, and without limitation, first part housing 440 and second part housing 450 may be conical or frusto-conical as depicted in FIGS. 4, 4A and 4B or may be cylindrical as depicted in FIG. 2. Alternatively, one skilled in the art would recognize that other geometries are contemplated, such as, without limitation, pyramidal, triangular, squared, oval, etc. Additionally, first part housing 440 and second part housing 450 could be different geometries from each other provided air passage 420 is included to allow the flow of air between first part housing 440 and second part housing 450 produced by fan 412 so as to cool heat sink 406.

In one alternate embodiment, fan 412 may be reversible so as to reverse the flow of air within airways 420. The purpose of this is to be able to clear any type of clog that may have formed such as storm debris, bird nests, water, or even ice which may form in the winter.

With reference to FIGS. 4A and 4B in an alternate preferred embodiment, a shutter 424 may be inserted in the interior of reflector 414. Shutter 424 may be beneficial in any embodiment but may have particular utility when fixture 102 is employed for architectural applications, particularly when directed toward the sky and where lens 204 may receive direct sunlight.

Shutter 424 is preferably coated on one surface 426 with reflective material similar to that coating the surfaces of the interior of reflector 414 such that when shutter 424 is in the open position, as depicted in FIG. 4A, surface 426 reflects and directs light out of reflector 414 through lens 204 in the same manner as in FIG. 4. Alternatively, shutter 424 may be closed as depicted in FIG. 4B so as to protect LED 402 from potential damage from sunlight entering the interior 430 of reflector 414 which may be otherwise focused by lens 204 on LED module 402. Surface 425 of shutter 424 may be coated with a reflective material to reflect such light and/or heat or may be optionally coated with a light and/or heat absorptive materially as a design preference.

In the embodiment depicted in FIGS. 4A and 4B, shutter 424 pivots from a hinge 432 and may extend across the interior 430 of reflector 414 at an angle when closed. Shutter 424 is thus positioned to be out of the focal point of lens 204 so as to avoid concentration of sun rays/heat on shutter 424. As will be apparent to one of skill in the art, shutter 424 could be designed to have a geometry which matches the geometry of the interior 430 of reflector 414 or any other suitable fashion and position to accomplish the task of protecting LED module 402.

In a preferred arrangement, shutter 424 would be closed (FIG. 4B) in the resting/off state of fixture 102. A motor or solenoid 434 may operate to open shutter 424 (FIG. 4A) such as when LED module 204 is activated (turned on) and close when LED module 204 is deactivated (turned off). Further, fixture 102 may be designed such that motor 434 could maintain shutter 424 in the closed position (FIG. 4B) in the event LED module 204 fails to light or goes out due to malfunction or overheating. Alternatively, fixture 102 may be designed such that LED module 204 remains deactivated (turned off) in the event shutter 424 fails to activate (open).

In an alternate embodiment, shutter 424 could be configured as an aperture such as a diaphragm shutter found in a camera lens, for example. Preferably, shutter 424 is positioned within the sealed first part housing 440 within the interior 430 of reflector 414 but could alternatively be positioned outside or on top of lens 204 such as in a basic embodiment. Shutter 424 could even be a leaf shutter manually positioned between an open and closed position.

Figure 6:
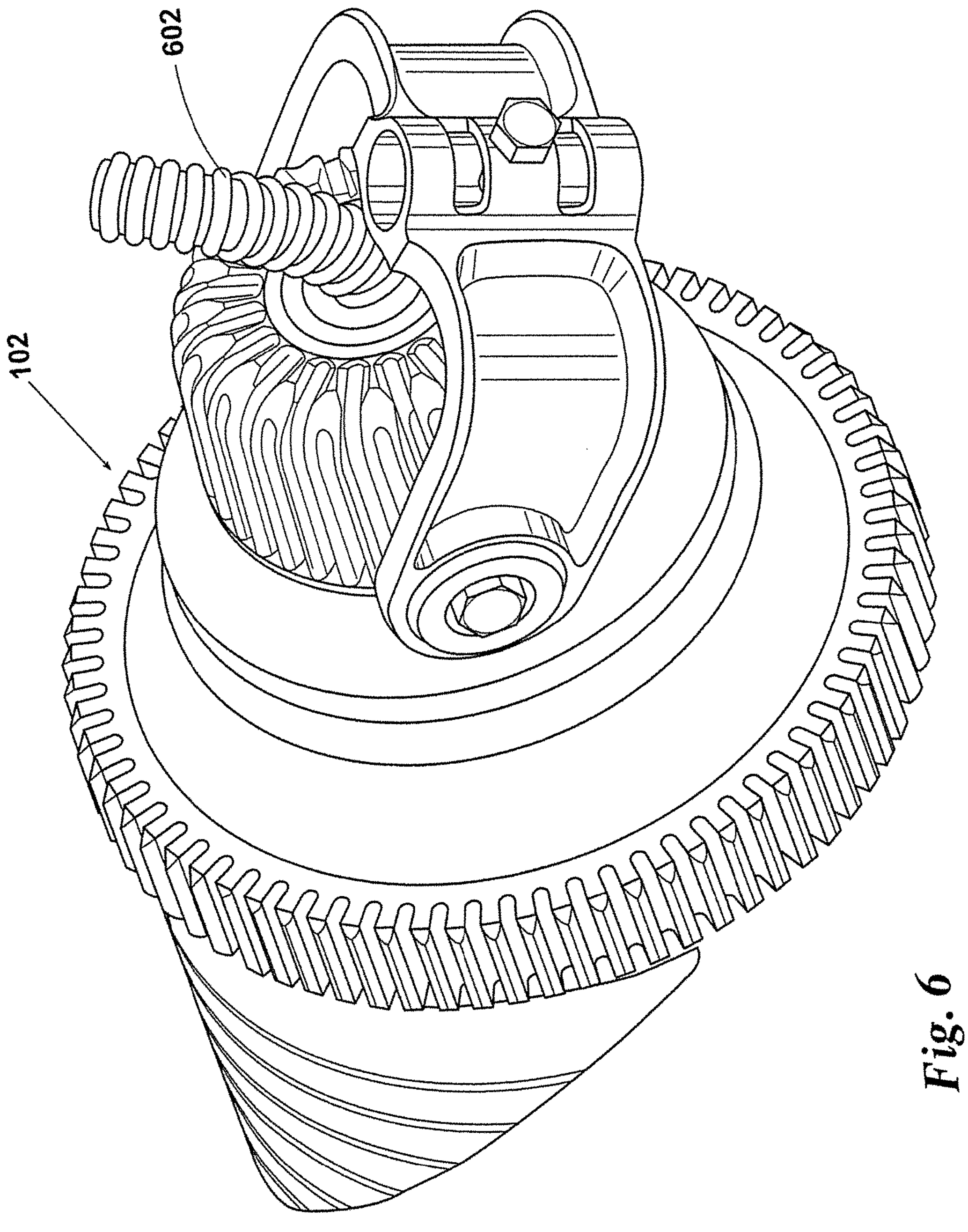
FIG. 6 depicts an embodiment of the present invention for ducting air used to cool the LEDs to a remote location.

With reference to FIG. 6, duct 602 may be used to deliver heated air from fixture 102 remotely. In an enclosed stadium, duct work could be used to exhaust the heated air outside when the weather is warm, thereby reducing the air conditioning requirements for the complex, or be ducted to field or seating level in cold weather to augment heating equipment. For example, if a football field is lighted to achieve 250 foot candles at field level, over 1.2 million Btu/hr of heat could be delivered outside, reducing the air conditioning requirements by approximately 100 tons. To further improve performance, outside air could likewise be brought in for cooling the fixtures so that inside air would not be discharged outside.

With outdoor stadiums, air carried by duct 602 could be collected from large groups of lights and delivered to the sidelines to warm player benches in cold weather. In warm weather, the heated air would simply be discharged upwards and away from spectators.

Figure 7:
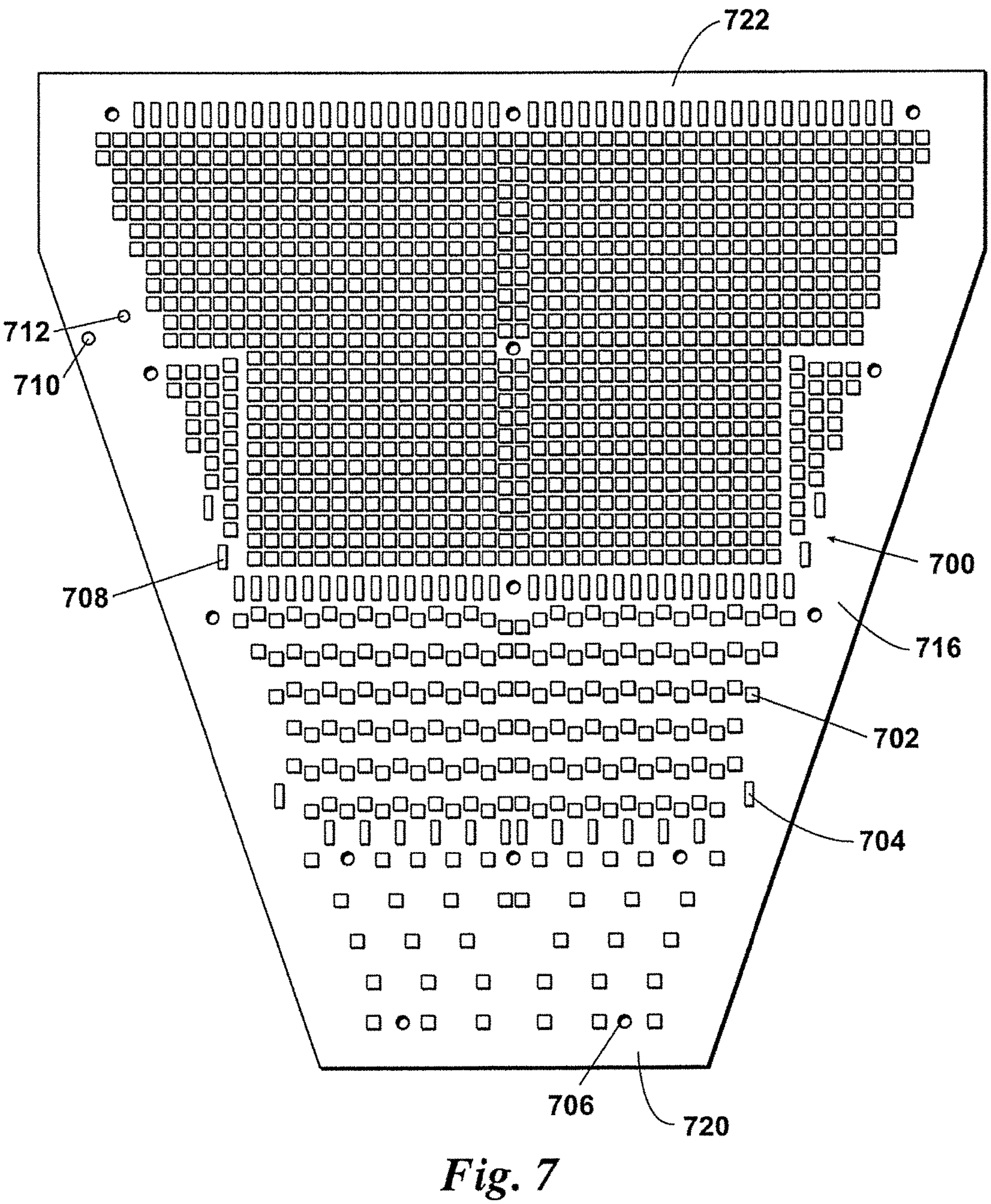
FIG. 7 provides a front view of an LED circuit board having an asymmetric array of LEDs, as used in one preferred embodiment of the present invention.
Figure 8:
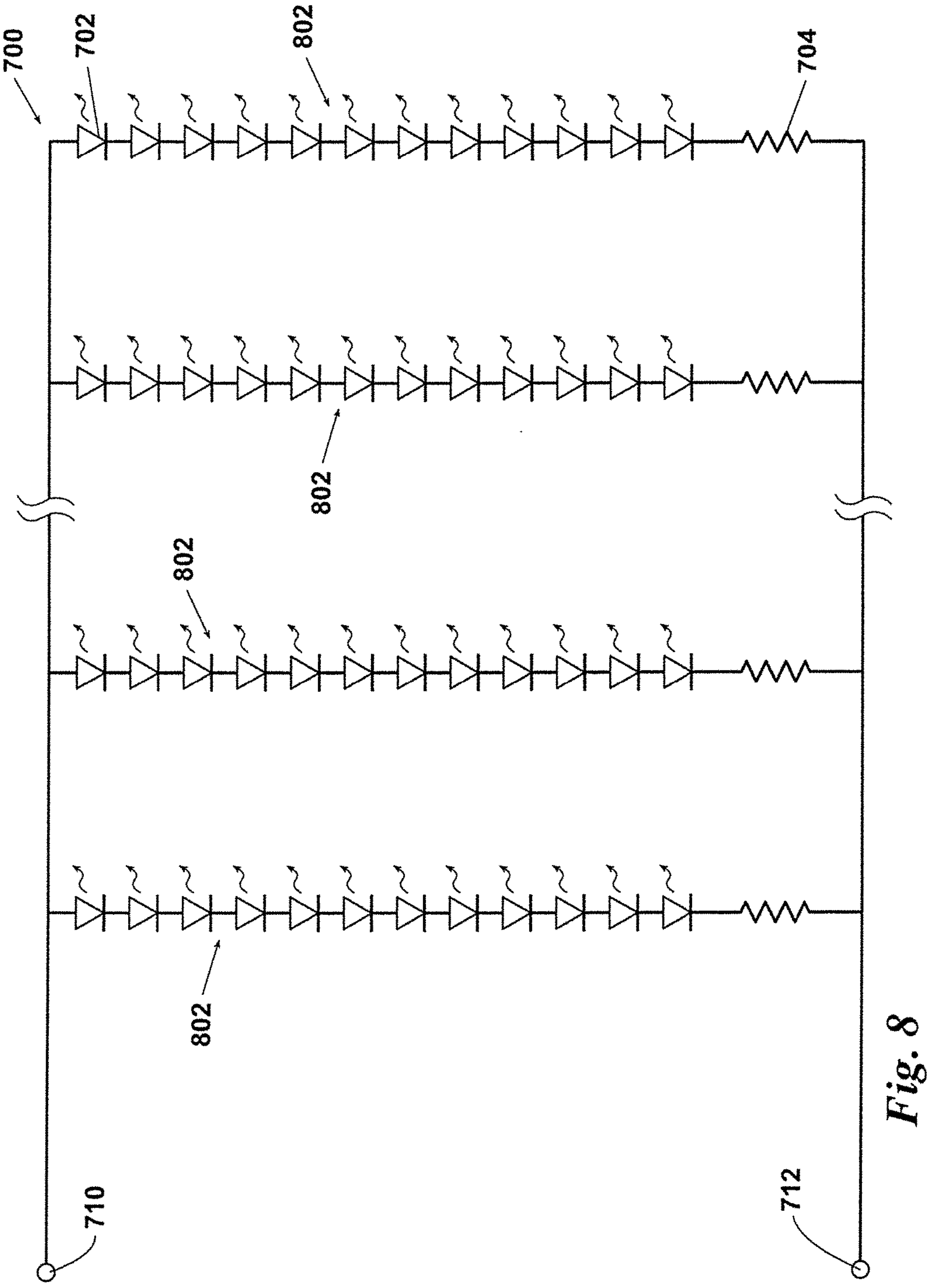
FIG. 8 provides a schematic diagram of the circuitry of the circuit board of FIG. 7.

In another preferred embodiment, rather than using a COB module, the LED module of the inventive luminaire employs a large, dense array of surface mount light emitting diodes 700 as shown in FIG. 7. Preferably, array 700 includes a plurality of LEDs 702 (1188 shown) mounted on an aluminum substrate circuit board 716, such boards are known in the art and available from several vendors. Preferably, the aluminum board would be a "direct thermal path" printed circuit board as manufactured by Sinkpad LLC of Placentia, Calif. One suitable LED is part number GS-3030W6-1G110-NWN manufactured by Shenzhen Guangmai Electronics Co., Ltd. Another suitable LED for this purpose is Cree XLamp LEDs manufactured by Cree, Inc., Durham, N.C. With further reference to FIG. 8, by way of example and not limitation, the LEDs 702 of board 700 are grouped in to 99 series strings 802, each string having 12 LEDs.

It should be noted that in this embodiment, board 700 is laid out such that the number of LEDs contributing light are far fewer at the top 720 than at bottom 722. Since the light is inverted as it passes through the Fresnel lens, when the fixture is pointed at the field, there will be more LEDs contributing light incident at the furthest point than at closer points, thus overcoming the inverse square falloff of light intensity typical of prior art fixtures.

Since the fixtures 102 are typically mounted as depicted in FIG. 1, the emitted light is not directly overhead of the field but rather strikes the field at an angle. The light intensity will not be the same across the beam (Keystone effect). The array of FIG. 7 accommodates for this and evens out the projected light intensity over the coverage area of the fixture. As stated above, this delineated, asymmetrical LED array straightens out the keystone effect. In such an embodiment it may also be desirable to include a heat sink which is asymmetrical as well to match the asymmetrical LED array 700. Ideally, each LED 702 would operate at the same, or close to the same, temperature.

In an alternate arrangement, the array may use LEDs of different wattages so as to provide increased intensity areas. This may eliminate perceived dark areas or shadows as may be necessary or desired.

Additionally and/or alternatively, LEDs 702 may be grouped together in a plurality of separate electrical channels. This provides benefits in redundancy and other benefits. For example, without limitation, the different channels may be independently dimmed. A preferred arrangement would include at least two dimming channels. The preferred arrangement would include one driver for each channel and would each independently operate as discussed below with regard to FIG. 9 and FIG. 10.

It should be understood by one of skill in the art that the asymmetrical design of FIG. 7 is one suitable embodiment, and that other suitable asymmetrical designs are contemplated. Such asymmetrical designs may be determined empirically as a result of the characteristics of the Fresnel lens selected as well as the geometry of the field or surface being lit by the fixture. As a result, alternate embodiments may be derived for certain conditions or to accomplish certain goals such as, without limitation, providing even lighting to the field or surface in the avoidance of dark areas or shadows.

Figure 7B:
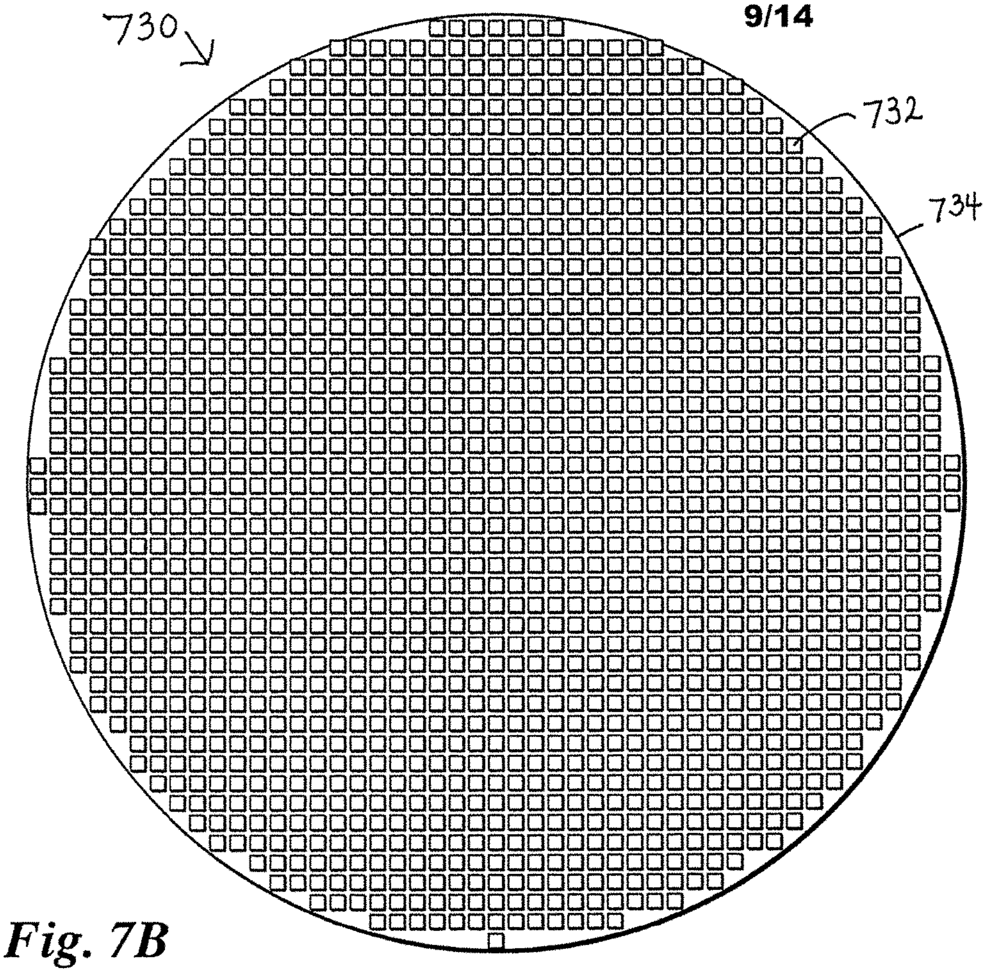
FIG. 7B depicts an alternate embodiment LED circuit board of FIG. 7.

FIG. 7B depicts an alternate array 730. Array 730 includes a plurality of LED lighting elements 732 mounted to a board 734. As shown, array 730 is an alternative embodiment symmetrical array disposed on a substantially circular board 734. As is the case with the array depicted in FIG. 7, the array 730 of FIG. 7B may include individual LEDs 732 of various wattage intensities. In addition, array 732 may be divided into a plurality of electrical channels such that each channel may be controlled/dimmed independently in the same manner as described above.

Figure 12:
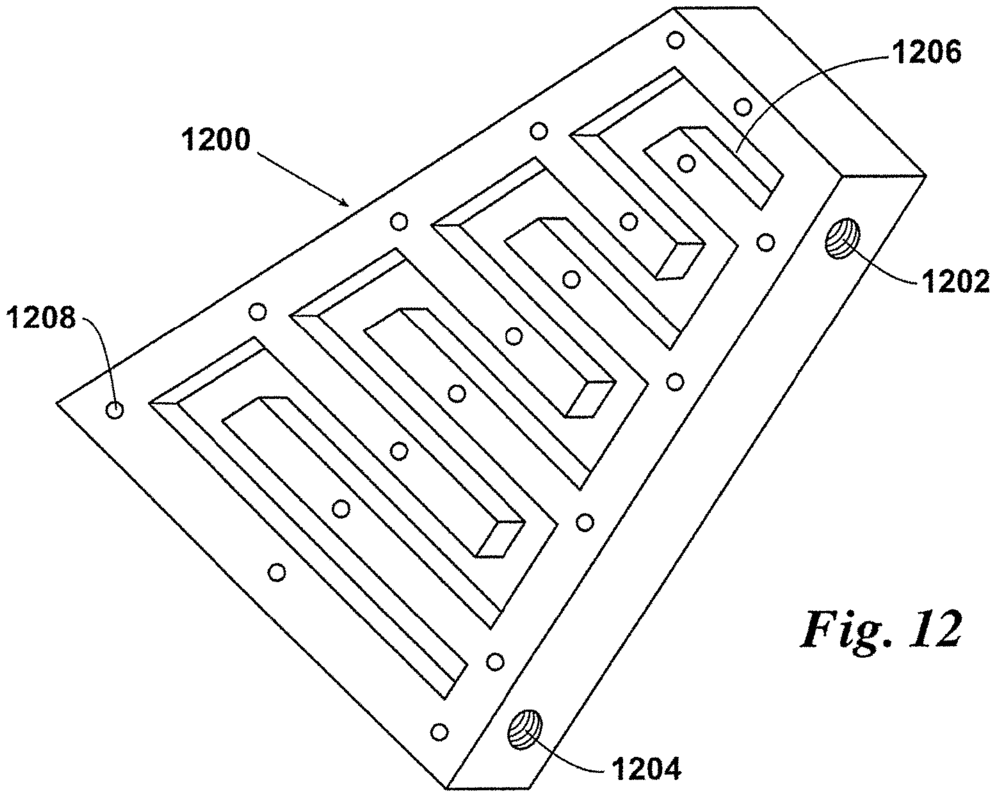
FIG. 12 depicts a liquid block for a liquid cooled heat sink suitable for use with the circuit board of FIG. 7 and/or FIG. 7B.
Figure 11:
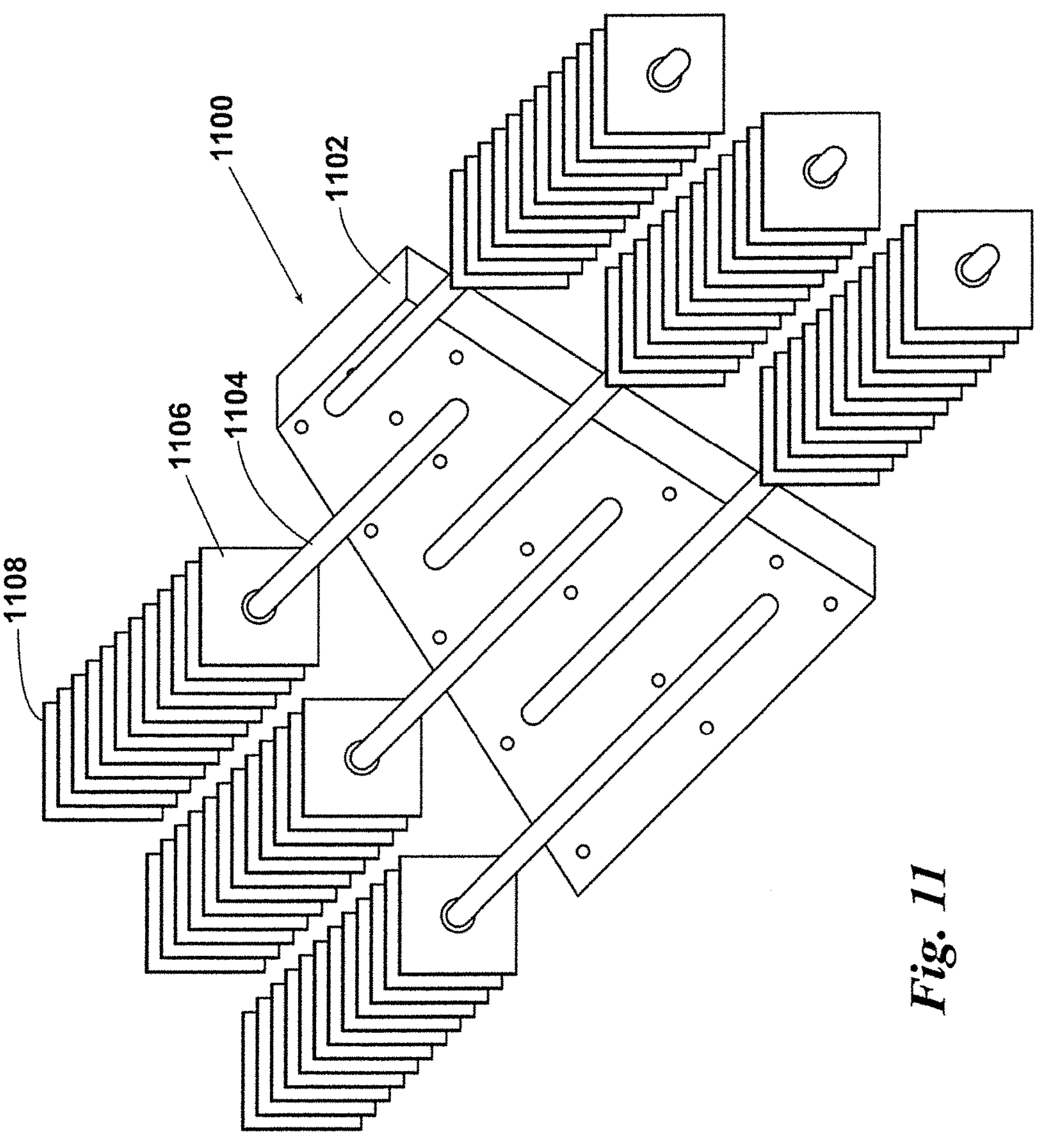
FIG. 11 provides a front view of preferred embodiment of a heat sink for use with the circuit board of FIG. 7 and/or FIG. 7B.

Turning to FIG. 11, the heat sink 1100 adapted for board 700 of FIG. 7 includes: a heat block 1102 a plurality of heat tubes 1104 pressed into block 1102 and a fin assembly 1106 coupled to the distal end of each heat tube 1104. Each fin assembly 1106 comprises a plurality of fins 1108 pressed onto tube 1104. Alternatively, board 700 may be liquid cooled using the liquid block 1200 of FIG. 12. Liquid block 1200 includes passageway 1206 having a threaded inlet 1202 and threaded outlet 1204 such that fittings may be threaded into each end of passageway 1206. Threaded holes 1208 are provided to attach a cover (not shown) with screws. Board 700 of FIG. 7 is attached to liquid block 1200 and a continuous flow of liquid is provided to cool board 700. The liquid may be cooled elsewhere through a common heat exchanger. The advantage of such a system is the ability to remove large quantities of heat with small plumbing (as compared to ducting air).

As is well known in the art, parallel arrangements of LEDs do not load share well without ballasting. While variations in forward voltage can cause a single string to draw too much current, a larger problem is that the forward voltage falls as an LED warms up. Thus, if one string is warmer than its companion strings, the forward voltage of the string will fall causing it to draw more current at the expense of current flowing through the other strings. More current will cause the string to get hotter still causing the forward voltage to drop even more, and so the process continues. Ballasting radically reduces the positive-feedback between current hogging and thermal runaway. Thus each string includes a ballast resistor 704. This arrangement is shown schematically in FIG. 8 By way of example and not limitation, in the present embodiment a 2 ohm resistor is employed to control thermal runaway satisfactorily.

To illuminate the LEDs 702, positive electrical power is applied at terminal 710 and negative power at 712. In a preferred embodiment, the power applied at terminals 710 and 712 will be current controlled and deliver approximately 23 amps at maximum brightness. LEDs 702 are rated at one watt per device. While the LEDs 702 of board 700 are thus capable of operating collectively at 1188 watts, in the preferred embodiment it is contemplated that board 700 will be operated at 1000 watts, thus operating each string 802 at roughly 234 milliamps.

Figure 9:
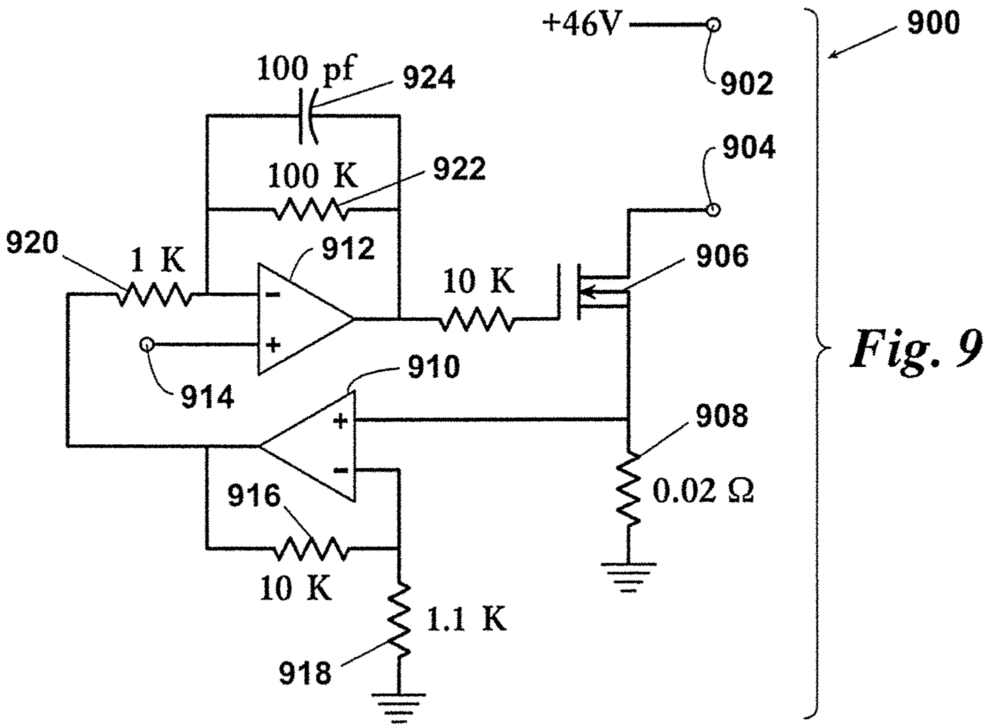
FIG. 9 provides a schematic diagram for one preferred method of controlling the electrical current through the LED array of the circuit board of FIG. 7 and/or FIG. 7B.

As stated previously, the proper method for driving LEDs is through current, rather than voltage, control. One scheme for properly driving the array of FIG. 8 is depicted in FIG. 9. Circuit 900 includes: terminal 902 for providing a voltage output; terminal 904 which provides a return path for the current flowing through terminal 902; a transistor 906 for controlling the current received at terminal 904; a current sense resistor 908 for developing a voltage proportional to the electrical current flowing through transistor 906; a first amplifier 910 for scaling the voltage sensed across resistor 908; and a second amplifier 912 for comparing the scaled current sense value to a reference voltage applied at input 914. As will be apparent to one of ordinary skill in the art, transistor 906 is shown as a MOSFET, however, as will be apparent to one of skill in the art, a bipolar transistor could be substituted with only minor modifications.

When a current is flowing through transistor 906 a voltage is developed across resistor 908. In one preferred embodiment, resistor 916 and resistor 918 are selected to provide a gain of ten. Thus, by way of example and not limitation, if 20 amps of electrical current is flowing through resistor 908, the output of amplifier 910 would be four volts. If the voltage at input 914 is less than four volts, the output of amplifier 912 will move towards its minus rail, thus reducing the current flowing through transistor 906. If the voltage at input 914 is greater than four volts, the output of amplifier 912 will move towards its positive rail, thus increasing the current flowing through transistor 906. Accordingly, with an input of four volts, circuit 900 will regulate the LED current at 20 amps. It should be noted that amplifier 912 could be used as a straight comparator, but by reducing the gain to 100 with resistors 920 and 922, the propensity of the circuit to oscillate or ring can be reduced. Optionally, capacitor 924 can be used to filter the output of amplifier 912 and thus limit the slew rate of its output to reduce overshoot and noise.

Figure 10:
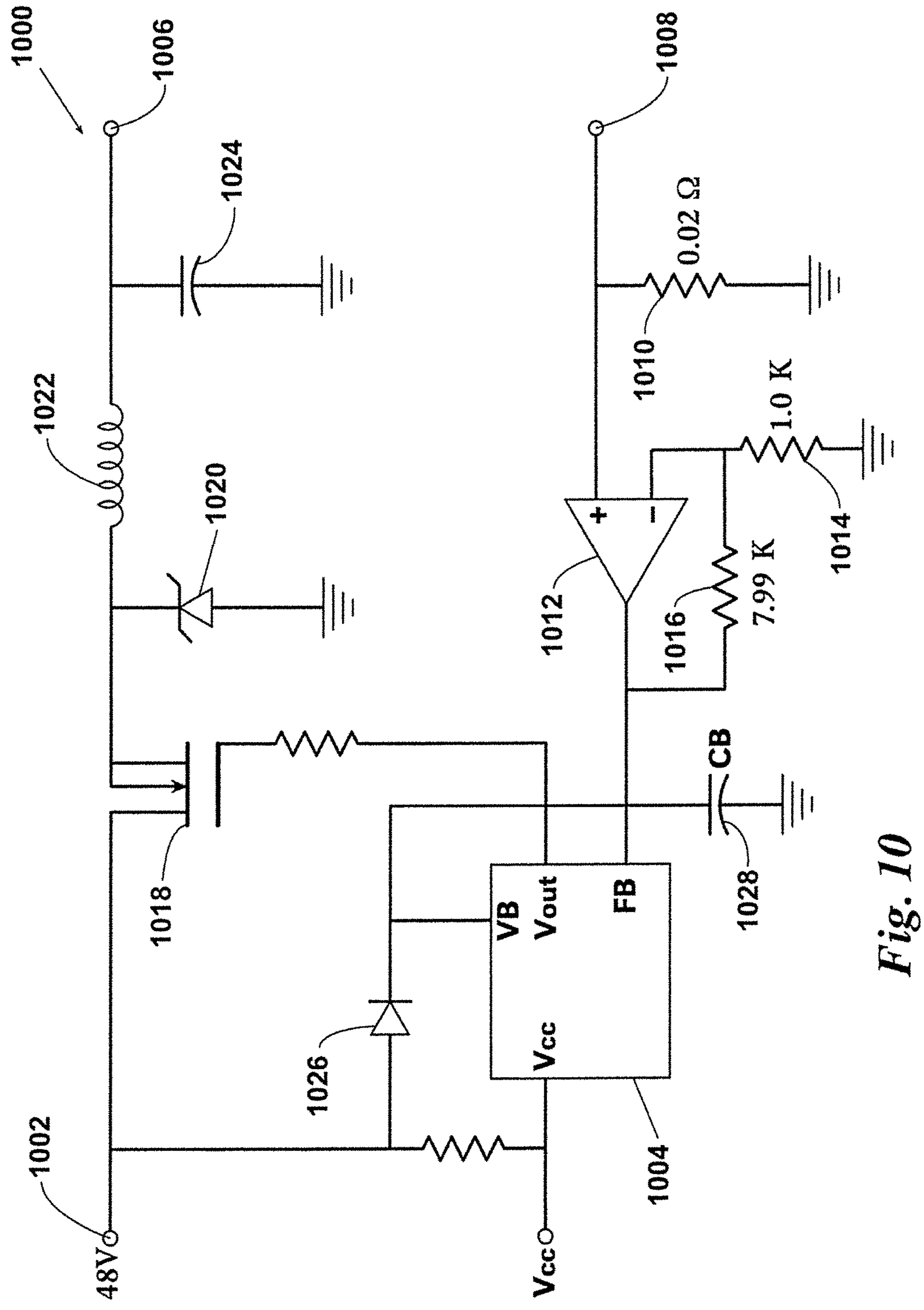
FIG. 10 provides a schematic diagram of an alternate method for controlling the electrical current through the LED array of the circuit board of FIG. 7 and/or FIG. 7B.

Another circuit which could be used to control the current through the LED array is shown in FIG. 10. Circuit 1000 is a switch mode buck current regulator, which are well known in the art. Circuit 1000 typically includes: an input 1002 for receiving an input voltage, a pass transistor 1018 for controlling the input current in a binary minor; a Schottky, or other fast recovery diode 1020, to provide the current path when transistor 1018 is switched off; inductor 1022; capacitor 1024; terminal 1006 for providing an output current to the LED array; terminal 1008 for providing a return path; current sense resistor 1010 which develops a voltage proportional to the current through the LED array; amplifier 1012 which scales the voltage from current sense resistor 1010; and controller circuit 1004 which compares the voltage from amplifier 1012 to a reference voltage and controls the duty cycle applied to transistor 1018 to maintain the desired current. By way of example and not limitation, if controller 1004 has a reference voltage of 2.4 volts, then amplifier 1012 may have a gain of six, as determined by resistors 1014 and 1016 so that 20 amps would produce 2.4 volts at the output of amplifier 1012. Preferably controller 1004 includes a boost circuit including bootstrap diode 1026 and capacitor 1028 so that the output to the gate transistor 1018 will be higher than the voltage at input 1002, thus allowing for the use of an N-channel device 1018.

As will be apparent to one skilled in the art, the choice of using a linear circuit such as circuit 900 of FIG. 9 or a switch mode regulator such as circuit 1000 of FIG. 10 involves the balancing of a number of factors. At full brightness, by judicious selection of the input voltage, the efficiencies of the two circuits are comparable. During dimming, the switch mode circuit will have better efficiency than the linear circuit. However, the linear circuit is far less expensive, far lighter weight, and does not raise the electrical emission concerns posed by the switch mode system.

As will be apparent to one skilled in the art, the present invention can incorporate an asymmetric array of LEDs to compensate for the inverse square fall off nature of light. This particular problem arises when a light source is aimed such that the light beams strike the target at an angle rather than straight-on. It should be noted that by passing the light generated by the light emitting diodes through a single lens, the asymmetric nature of the light can be preserved at the target location of the fixture. To achieve a like result from an array of LEDs which were individually lensed would require the array to employ many different lenses to provide varying beam sizes to achieve even lighting over the lit area.

The precise number of fixtures required for a particular venue will depend on a number of factors beyond just light levels. For example, the set back of the poles 104 (FIG. 1) from the field and the height of the lighting poles, the size of the area to be lit, how much light to put on spectator seating, sidelines, etc., the cost of the installation, the cost of operation, and the cost of maintenance are all considerations in a lighting plan. In the retrofit of metal halide lighting in an existing stadium, it is contemplated that the same number of fixtures could be employed following the original lighting plan for the facility. The fixtures would simply be dimmed to produce the desired light level. It would be apparent to one of skill in the art that dimming the fixture and the ability to dim (customize) for a particular event would maximize the efficiency of the fixture and thereby provide cost savings. In other words the fixture can be dimmed so that only the necessary amount of light is produced for the event, thus saving energy and money.

It should also be noted that the present invention is driven by DC electrical power at approximately 46-48 volts. In a large stadium where three phase power is available, it may be advantageous to select three phase transformers that, when rectified with a six diode bridge, will produce approximately 46-48 volts DC and produce the appropriate power in-bulk for an entire array of fixtures for a single pole. Where three phase power is not readily available, or in installations where the total harmonic distortion of current taken from the power utility is of concern, it may be more practical to use a power supply which takes line voltage in and delivers 46-48 volts DC out. Such power supplies capable of delivering 1000 watts of power are well known in the art and readily available.

Figure 13:
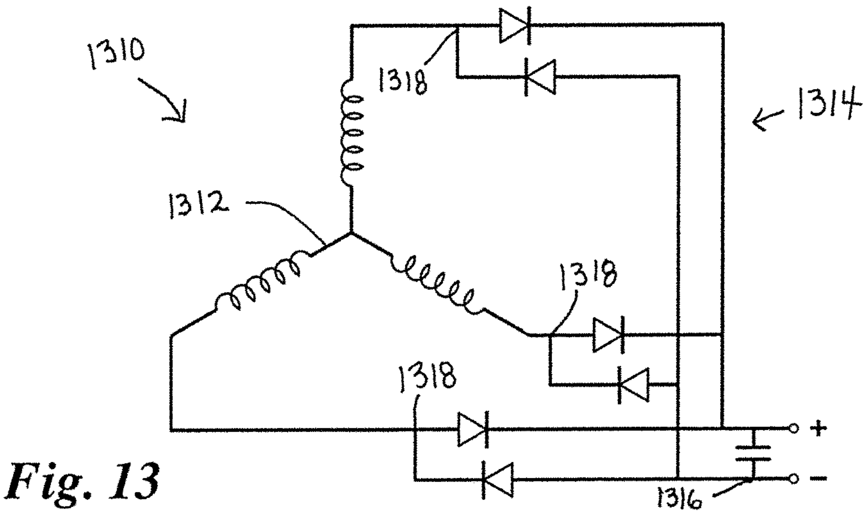
FIG. 13 depicts a schematic diagram for an alternate embodiment ballasting transformer for use with the light fixture of the present disclosure.

In one alternate preferred embodiment where three-phase power is available, a transformer may be included to provide ballasting effect. With reference to FIG. 13, a schematic diagram for a ballasting transformer 1310 is depicted. Ballasting transformer 1310 preferably includes three elements: transformer 1312; rectifier 1314, and capacitor 1316. Transformer 1312 may be a three phase 480V to 35V transformer known in the art. Rectifier 1314 is preferably a six diode bridge, collectively 1318. Capacitor 1316 is preferably a 10,000 microfarad electrolytic capacitor. It is understood, however, that the three elements could be altered as known in the art by one of skill in the art.

Transformer 1312 inherently current limits. This is because the inductance of the winding in light of the operating frequency limits the output current of the transformer. The result being a transformer 1310 that provides the requisite power in-bulk for an entire array of fixtures for a single pole, or for a single fixture. As will be apparent to one skilled in the art, the circuit of FIG. 13 is also applicable when transformer 1312 is not self-ballasting. As the light is dimmed there will be some increase in the voltage output by the circuit. This will cause more heat loses in the transistors of the current regulator but will not otherwise effect the operation of the fixture.

Figure 14:
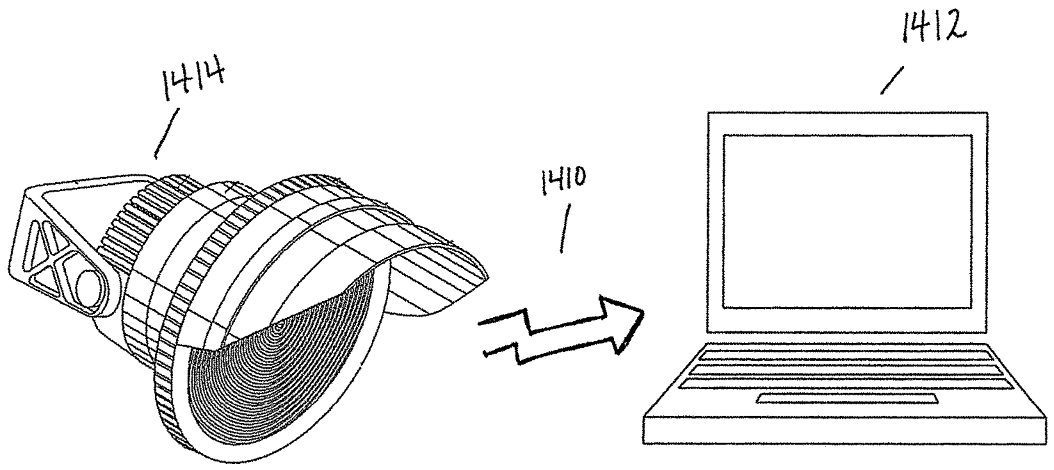
FIG. 14 depicts the digital interface between a light and a computer host.

In a preferred embodiment, as depicted in FIG. 14, a digital interface 1410 may be provided to connect a fixture or plurality of fixtures 1414 with a host 1412 for control and data collection. This digital interface 1410 with a host 1412 (computer) can be accomplished in any known manner, such as internet protocols (RS-232); via Ethernet; USB; or other suitable communication interface known to one of skill in the art. Digital interface 1410 could be either wired or wireless. The purpose of digital interface 1410 is for controlling the light fixtures collectively (such as depicted FIG. 1) and individually and may control, without limitation, input voltage/intensity/dimming of the LED array. The digital interface may also be useful for monitoring and keeping track of the operating conditions of each light separately or a pole of lights collectively. Operating conditions may include LED temperature, fan speed/air flow and other useful conditions. For example, a condition such as LED temperature may affect control functions such as fan speed of an individual fixture or conditions relating to a plurality of fixtures.

Digital interface 1410 allows the collection of data at host computer 1412 so that useful trends may be observed, in what may be known in other contexts as Statistical Process Control. The host computer 1412 preferably includes software that keeps track of the operating conditions/trends of the lighting fixtures 1414. Keeping track of trends allows identification of failing systems before they become a larger problem or lead to fixture or system failure. For example, and not limitation, in a known temperature condition, such as 75° F., the software in the host computer may determine over time that the fan in the lighting fixtures has a normal operating range of a certain CFM (cubic feet per minute). The software in the host computer may additionally be programmed to detect when the CFM of the fan in one or more of the individually lighting fixtures is trending downward in the same (temperature) conditions. It can then alert an operator that maintenance of the lighting fixture(s) may be required before the fan or fans fail. As a result, the fan or fans may be either fixed or replaced before it/they fail which may in turn avoid failure of the entire LED array in the fixture. Thus, failure of a fixture during an event is avoided and costly repairs or replacement of entire fixtures can likewise be avoided. It should be understood that the specific example pertaining to the fan is for exemplification purposes only and that other operating conditions/data is contemplated and may be identified and tracked for trends as would be apparent to one of skill in the art (such as the ballast transformer 1310 of FIG. 13 discussed below).

As will be apparent to one skilled in the art, the inventive luminaire could also find broad use in architectural lighting. It should be noted that the asymmetric array of LEDs used to overcome inverse square fall off could be exaggerated to improve the look of the light at extreme angles of incidence as commonly found in building washes.

Finally, while preferred embodiments of the present invention have been described as employing a plastic Fresnel lens, the invention is not so limited. Obviously a glass lens could be employed to achieve identical results or the invention could be readily modified to use multiple lenses.

* * *

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. An LED venue lighting system, comprising:

a first housing including an LED module having an input power of at least 450 watts and a first lens;

said first housing including at least one reflector;

said first housing being capable of being sealed in a weather-tight manner;

a heat block in thermal contact with said LED module, said heat block including at least one heat tube in thermal communication with said heat block;

a second housing at least partially surrounding said first housing such that at least one air passage is provided between said first housing and said second housing;

said second housing being adapted for receiving ambient air into said at least one air passage;

at least one fan in fluid communication with said at least one air passage said at least one fan being adapted for drawing ambient air into said at least one air passage and past said at least one heat tube;

said LED venue lighting system being configured to allow mechanical connection to a cross-arm support.

2. The LED venue lighting system of claim 1 wherein said at least one heat tube includes a coolant liquid.

3. The LED venue lighting system of claim 1 wherein said first lens is glass.

4. The LED venue lighting system of claim 1 wherein said reflector forms at least a segment of said first housing.

5. The LED venue lighting system of claim 1 further including a host computer wherein a digital interface connects said host computer to said LED module.

6. The LED venue lighting system of claim 1 further including a visor to shade said first lens.

7. The LED venue lighting system of claim 1 wherein said LED module is a chip-on-board type module.

8. The LED venue lighting system of claim 1 wherein said LED module includes a plurality of LEDs mounted on a printed circuit board.

9. The LED venue lighting system of claim 8 wherein said LEDs are mounted to said printed circuit board in an asymmetrical arrangement.

10. The LED venue lighting system of claim 1 wherein said LED module is divided into a plurality of independently dimmable electrical channels.

11. The LED venue lighting system of claim 8 wherein said printed circuit board is a metal direct thermal path printed circuit board.

12. An LED venue lighting system, comprising:

a first housing including at least one LED, having a total fixture input power of at least 450 watts and at least one optical element, wherein said at least one optical element is not a TIR lens a reflector;

said housing being capable of being sealed in a weather-tight manner;

a second housing at least partially surrounding said first housing such that at least one air passage is provided between said first housing and said second housing;

said second housing being adapted for receiving ambient air into said at least one air passage adjacent said single lens;

a heatsink in thermal contact with said at least one LED;

at least a portion of said heat sink in fluid communication with said at least one air passage;

at least one fan in fluid communication with said at least one air passage;

said at least one fan being adapted for drawing ambient air into said at least one air passage and past said at least one heat sink.

13. The LED venue lighting system of claim 12 further including a host computer wherein a digital interface connects said host computer to said at least one LED.

14. The LED venue lighting system of claim 12 wherein said at least one LED is a chip-on-board type module.

15. The LED venue lighting system of claim 12 wherein said at least one LED includes a plurality of LEDs mounted on printed circuit board.

16. The LED venue lighting system of claim 12 wherein said printed circuit board is a metal direct thermal path printed circuit board.

17. The LED venue lighting system of claim 12 wherein said heatsink has at least one heatpipe.

18. The LED venue lighting system of claim 12 further including multiple reflectors.

* * * * *